(12) United States Patent
Drage

(10) Patent No.: US 7,044,562 B1
(45) Date of Patent: May 16, 2006

(54) WHEEL RIM

(76) Inventor: Kevin Linane Drage, 33 Ayton Avenue, Fulham (AU) 5024

( * ) Notice: Subject to any disclaimer, the term of this patent is extended or adjusted under 35 U.S.C. 154(b) by 168 days.

(21) Appl. No.: 10/110,970

(22) PCT Filed: Oct. 19, 2000

(86) PCT No.: PCT/AU00/01269

§ 371 (c)(1),
(2), (4) Date: Sep. 26, 2002

(87) PCT Pub. No.: WO01/28786

PCT Pub. Date: Apr. 26, 2001

(30) Foreign Application Priority Data

Oct. 19, 1999 (AU) .................................. PQ3505

(51) Int. Cl.
*B60B 21/02* (2006.01)
(52) U.S. Cl. .............................. 301/95.101; 301/110.5; 301/65
(58) Field of Classification Search ............ 301/93.01, 301/93.02, 93.03, 93.04, 93.05, 93.06, 93.07, 301/93.08, 93.09, 9.1, 65, 67, 10, 242, 30, 301/55.1
See application file for complete search history.

(56) References Cited

U.S. PATENT DOCUMENTS

| | | | | |
|---|---|---|---|---|
| 335,590 | A * | 2/1886 | Jeffery | 280/200 |
| 348,692 | A * | 9/1886 | Rice | 152/396 |
| 365,091 | A * | 6/1887 | Owen | 280/200 |
| 602,671 | A * | 4/1898 | Trench | 152/514 |
| 2,126,222 | A * | 8/1938 | Schwinn | 301/95.106 |
| 2,937,905 | A * | 5/1960 | Altenburger | 301/58 |
| 4,275,931 | A * | 6/1981 | Reppert | 301/35.57 |
| 4,436,133 | A * | 3/1984 | Rohr | 152/381.3 |
| 4,518,204 | A | 5/1985 | Takada | |
| 5,360,261 | A * | 11/1994 | Archibald et al. | 301/63.107 |
| 5,429,422 | A | 7/1995 | Baldi | |
| 5,548,896 | A * | 8/1996 | Archibald et al. | 29/894.322 |
| 5,794,340 | A * | 8/1998 | Pollkotter | 29/894.324 |
| 5,826,949 | A | 10/1998 | Bortoloni | |
| 5,997,102 | A * | 12/1999 | Stanavich | 301/63.103 |
| 6,158,820 | A * | 12/2000 | Archibald et al. | 301/65 |
| 6,367,883 | B1 * | 4/2002 | Chen | 301/55 |
| 6,497,042 | B1 * | 12/2002 | Dietrich | 29/894.333 |
| 6,536,111 | B1 * | 3/2003 | Baumgarten et al. | 29/894.324 |

FOREIGN PATENT DOCUMENTS

WO    WO 81/03465    12/1981

* cited by examiner

*Primary Examiner*—Russell D. Stormer
(74) *Attorney, Agent, or Firm*—Crowell & Moring LLP

(57) ABSTRACT

An automotive wheel rim to receive a vehicle tire, at least one tire bead seat extending inwardly of the wall of the rim whereby the outer contour or profile of the wheel rim is selected to be of a different contour or profile to the inner contour or profile of the rim.

1 Claim, 3 Drawing Sheets

WHEEL RIM

BACKGROUND OF THE INVENTION

This invention relates to a vehicle wheel for automobiles such as passenger cars, trucks, buses and motor cycles, and more particularly to a modified wheel rim for such vehicles.

Most automobile wheels have rims which are manufactured to an internationally recognized standard, an example of which is shown in FIG. 1 of the accompanying drawings where the rim is attached to a central disk to form the wheel. The purpose of the standardized rim profile is to provide compatibility with the specifically designed tire sizes and also to ensure that adequate provision is also made for the mounting and demounting of tires to and from the rim.

Historically these international rim standards were based on rim profiles that were originally developed by the then current manufacturing processes i.e., rolling wrought steel strips into a suitable rim profile and butt welding into a circular wheel rim. The outer profile of the rim thus closely follows the internal profile of the rim resulting in a rim profile which is virtually standard on all wheels. Cover plates, wheel trims, hub caps or the like have been developed to improve the aesthetic appearance of a wheel, often by clipping onto the outer edge of the rim so that the entire rim profile is hidden.

However today there are many processes by which automobile wheels can be manufactured, including stamping, pressing drawing, roll forming, forging, moulding and casting, some of which may allow for the adoption of a modified rim profile which still meets the basic requirements for tire mounting and compatibility. It is essential that the internal configuration of the wheel rim meet the international standards for the support of the bead of the tire and the mounting and demounting of the tire.

If the profile of the outer surface of the rim portion of the wheel rim is to be changed, for example in making the outer profile rounded or curved in some way, the result could appear as shown in FIGS. 2 and 3. FIG. 2 depicts a motor car wheel having a rounded outer surface of the wheel rim, that is the outer surface which is outermost of the vehicle, and FIG. 3 showing a motor cycle wheel in which both sides of the rim are rounded. These wheel rims while being of pleasing appearance may have manufacturing problems, but also have the greater disadvantage of being unduly heavy, there being a greater mass in the rim of the wheel. This greatly increases the unsprung weight of the suspension and detracts from the ride, handling and road holding characteristics of the vehicle.

Reference is also made to U.S. Pat. Nos. 4,854,646 and 5,749,982 which show various wheel rim profiles, the outer contours of which follow the internal profile of the rim. Australian patent specification shows a further wheel rim in which the outer profile follows the internal profile of the rim, a further example being shown in Australian Registered Design No 66313.

SUMMARY OF THE INVENTION

It is an object of the invention to provide a profile of a wheel rim which, while maintaining the fitment and performance characteristics of the tire seat and safety hump permits the outer surface or surfaces of the wheel rim to have varying profiles.

It is a further object of the invention to be able to vary the outer profile of a wheel rim without appreciably increasing the mass of the rim of the vehicle wheel while maintaining the inner profile of the rim.

Thus there is provided according to the invention a wheel rim in which at least one tire bead seat extends inwardly of the rim from an outer contoured surface of the rim while maintaining the fitment and performance characteristics of the tire bead seat and safety hump of the wheel rim.

Preferably the tire bead seat extends inwardly in cantilever fashion from the internal surface of the rim wall.

Preferably the wheel rim has a cantilevered bead seat extending from each side of the rim whereby both sides of the wheel rim may be contoured.

Preferably the tire bead seat is additionally supported by webs or the like from the base of the rim.

DETAILED DESCRIPTION OF THE PREFERRED EMBODIMENTS

Figure 4:
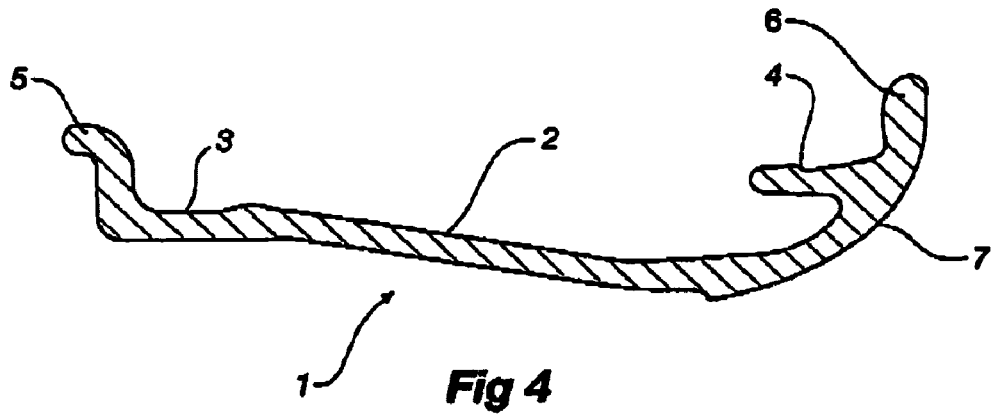
FIG. 4 shows a cross-section of a motor vehicle rim according to the invention.
Figure 4B:
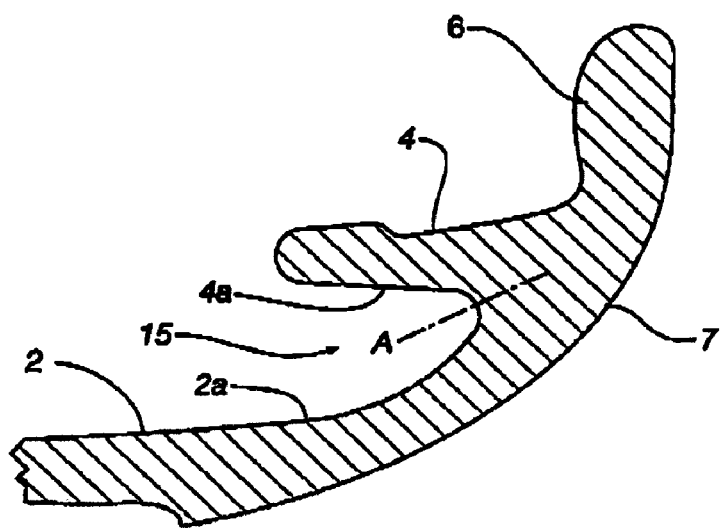
FIG. 4a is an enlarged detail view of the non-symmetrical continuous circumferential recess in the rim.

Referring to FIG. 4, the wheel rim 1 has a base portion 2, an inner tire bead seat 3 and an outer tire bead seat 4 The rim extends to the edges 5 and 6. The outer contour of the outer surface 7 of the rim in this example is curved to have a smooth surface.

The tire bead seat 4 extends in cantilever fashion from the inner wall of the rim, creating a non-symmetrical continuous circumferential recess between the underside 4a of the bead seat 4, and the upper surface 2a of the base portion 2 of the rim 1. The top surface of the recess is the underside 4a of the bead seat 4, which is substantially planar; the bottom surface 2a of the recess is curved, so that the recess is non-symmetrical about its vertex at point A.

This non-symmetrical profile provides draft, or relief on the sides of the mold that creates the circumferential recess; this draft permits the mold to be removed without distorting or tearing, making the operation of removing the mold from the non-symmetrical continuous circumferential recess that it creates cleaner and more efficient.

Figure 1:
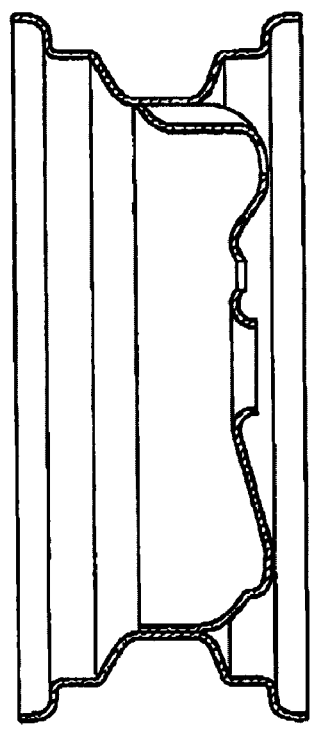
FIG. 1 is a side elevational view, partly in cross-section, of one form of prior art.
Figure 2:
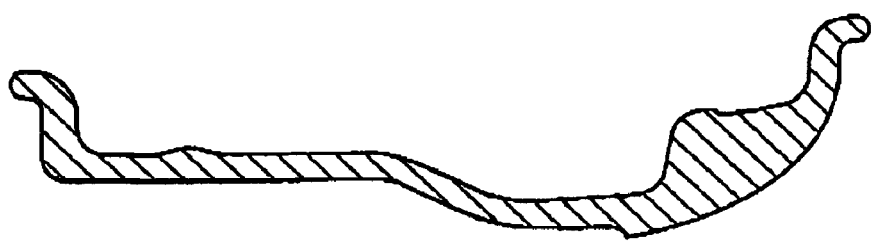
FIGS. 2 and 3 are examples in cross-section of the problem the present invention overcomes.
Figure 3:
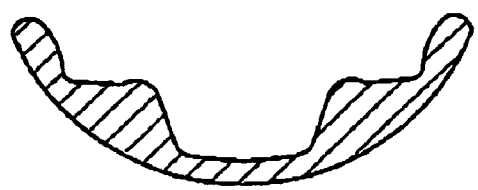

In this way the mass of the rim compared with the example as shown in FIG. 2 is greatly reduced, while the critical dimensions along with the intent of the recognized rim standard for the wheel are maintained. The internal structure of the rim maintains the important fitment and performance characteristics of the tire bead seat and the safety hump of the wheel rim but allows the area 15 under the cantilevered bead seat to be relatively open and free of material. As noted this results in a light weight wheel rim while resulting in a wheel rim which can have varying outer surface profiles as desired.

Figure 5:
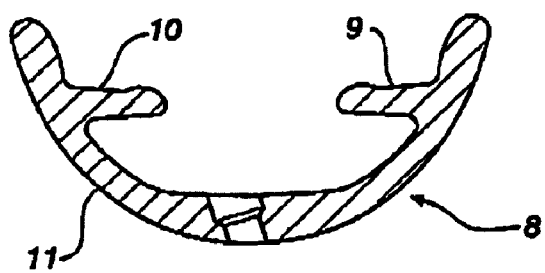
FIG. 5 shows a cross-section of a motor cycle rim according to the invention.
Figure 6:
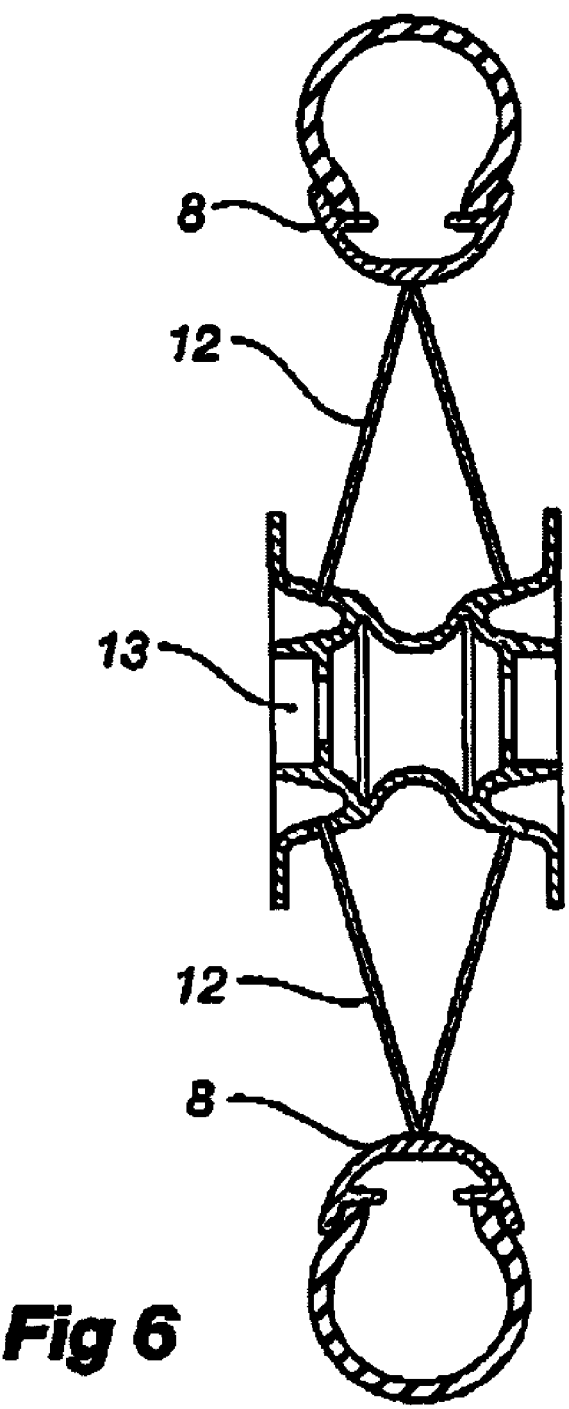
FIG. 6 is an elevational view, partly in cross-section, of the motor cycle wheel embodying the rim of FIG. 5.

FIGS. 5 and 6 show an example of a motor cycle wheel rim 8 and wheel embodying the invention, the rim 8 in this embodiment having a cantilevered bead seat 9 and 10 one on each side of the rim, thus permitting the wheel rim to have a curved profile 11 on each side of the rim. These cantilevered bead seats 9 and 10 form non-symmetrical continuous circumferential recesses between the undersides of the bead seats 9 and 10, and the inner surface of each of the side walls of the rim 8. As shown the rim can be connected by wire spokes 12 to a hub 13 to complete the wheel.

The rim may be attached to the hub of the wheel by wire or cast metal spokes, or by a central disk portion which can be bolted to the rim, welded to the rim, and welded or bolted to the hub of the wheel.

While the embodiments show a curved outer surface of a wheel rim, it is to be realized that various profiles of the outer surface of a wheel rim may be provided by the invention, the outer surface can be curved or profiled in any manner, there may be circumferential flat surfaces or surfaces of other shape and configuration.

Wheels with the proposed cantilevered tire bead seat may be constructed of one or more pieces which may be manufactured by pressing, stamping, drawing, roll forming, spinning, forging, molding, casting or other process. The various portions may be joined together to make a multipiece rim or wheel by welding, riveting, roll forming, shrink fit, gluing, screw fastening, and the rim can be attached to a hub by wire spokes, discs or any other method.

Thus it can be seen that there is provided according to the invention an automotive wheel such as for trucks, buses, motor vehicles and motor cycles which can have an outer profile which is not dictated by the inner profile of the rim thus resulting in an outer profile which can have a pleasing appearance.

What is claimed is:

1. A cast vehicle wheel having a rim to receive and support a tire, said rim comprising a pair of spaced circumferential side walls each having an outer surface and an inner surface, a cantilevered tire bead seat on each said inner surface, a base portion extending between each side wall, a non-symmetrical continuous circumferential recess formed on the inner surface of each side wall between said base portion and each said tire bead seat whereby each tire bead seat extends from its respective side wall and is unsupported except for its attachment to the respective inner surface of the rim, each said recess shaped to have draft, the side of the recess forming the tire bead seat being generally annular with the inner end of each recess sloping away from the tire bead seat to merge into the base of the rim.

* * * * *